United States Patent
Lapp et al.

(10) Patent No.: US 9,631,576 B2
(45) Date of Patent: Apr. 25, 2017

(54) PISTON ASSEMBLY WITH WELD SUPPORT

(71) Applicant: Mahle International GmbH, Stuttgart (DE)

(72) Inventors: Michael T. Lapp, Bloomfield, MI (US); Dieter Gabriel, Highland, MI (US)

(73) Assignee: Mahle International GmbH (DE)

( * ) Notice: Subject to any disclaimer, the term of this patent is extended or adjusted under 35 U.S.C. 154(b) by 344 days.

(21) Appl. No.: 14/186,651

(22) Filed: Feb. 21, 2014

(65) Prior Publication Data

US 2014/0238232 A1 Aug. 28, 2014

Related U.S. Application Data

(60) Provisional application No. 61/768,182, filed on Feb. 22, 2013.

(51) Int. Cl.
*F01B 31/08* (2006.01)
*F02F 3/16* (2006.01)
(Continued)

(52) U.S. Cl.
CPC .............. *F02F 3/16* (2013.01); *B23K 26/28* (2013.01); *B23K 26/32* (2013.01); *F02F 3/003* (2013.01);
(Continued)

(58) Field of Classification Search
CPC .................. F02F 3/003; F02F 3/20; F02F 3/22
(Continued)

(56) References Cited

U.S. PATENT DOCUMENTS 5,505,171 A * 4/1996 Gazzard ................. C22C 47/08
123/193.6
6,327,962 B1 * 12/2001 Kruse ........................ F02F 3/003
92/186
(Continued)

FOREIGN PATENT DOCUMENTS

DE 2141054 A1 3/1973
DE 102004061778 A1 4/2006
(Continued)

OTHER PUBLICATIONS

International Search Report for PCT/US2014/017716 mailed Aug. 6, 2014.
English Abstract for WO2007093289A1.
English Abstract for DE2141054.
English Abstract for DE102004061778A1.
English Abstract for DE102011107656A1.

*Primary Examiner* — Michael Leslie
(74) *Attorney, Agent, or Firm* — Fishman Stewart PLLC (57) ABSTRACT

Exemplary piston assemblies and methods of making the same are disclosed. An exemplary piston may include a piston body defining a piston axis, the piston body having a skirt and forming a lower surface of a cooling gallery. The body may include radially inner and outer body mating surfaces. The piston may further include a cooling gallery ring cooperating with the piston body to form the cooling gallery. The piston body and cooling gallery ring may be joined together along radially inner and radially outer interface regions to form a generally one-piece piston assembly. In some exemplary approaches, mating surfaces of the body and ring may be positioned adjacent a support surface configured to inhibit or prevent weld spatter formed in a process joining the ring and body from the cooling gallery.

15 Claims, 6 Drawing Sheets

(51) Int. Cl.
  *F02F 3/00*  (2006.01)
  *B23K 26/28*  (2014.01)
  *F02F 3/22*  (2006.01)
  *B23K 26/32*  (2014.01)
  *B23K 101/00*  (2006.01)
  *B23K 103/10*  (2006.01)

(52) U.S. Cl.
  CPC .......... *F02F 3/22* (2013.01); *B23K 2201/003* (2013.01); *B23K 2203/10* (2013.01); *F02F 2003/0061* (2013.01); *Y10T 29/49249* (2015.01)

(58) Field of Classification Search
  USPC .................................................... 92/186, 231
  See application file for complete search history.

(56) References Cited

U.S. PATENT DOCUMENTS

| | | | |
|---|---|---|---|
| 2011/0197845 A1* | 8/2011 | Flowers | ............... F02F 3/003 92/231 |
| 2013/0068096 A1* | 3/2013 | Gabriel | ............... B23P 15/10 92/231 |

FOREIGN PATENT DOCUMENTS

| | | | |
|---|---|---|---|
| DE | 102011107656 A1 | 1/2013 | |
| EP | 1061249 A2 | 12/2000 | |
| EP | 1614885 A2 | 1/2006 | |
| WO | WO-2007093289 A1 | 8/2007 | |

* cited by examiner

PISTON ASSEMBLY WITH WELD SUPPORT

CROSS-REFERENCE TO RELATED APPLICATION

This application claims priority to U.S. Provisional Application Ser. No. 61/768,182, filed on Feb. 22, 2013, the contents of which are hereby expressly incorporated by reference in its entirety.

BACKGROUND

Internal combustion engine manufacturers are constantly seeking to increase power output and fuel efficiency of their products. One method of generally increasing efficiency and power is to reduce the oscillating mass of an engine, e.g., of the pistons, connecting rods, and other moving parts of the engine. Efforts to increase engine power and/or efficiency also may also result in an increase in pressure and/or temperature within the combustion chamber during operation.

Engines, and in particular the pistons of the engine, are therefore under increased stress as a result of these reductions in weight and increased pressures and temperatures associated with engine operation. Piston cooling is therefore increasingly important for withstanding the increased stress of such operational conditions over the life of the engine.

To reduce the operating temperatures of piston components, a cooling gallery may be provided about a perimeter of the piston. A coolant such as crankcase oil may be introduced to the cooling gallery, and may be distributed about the cooling gallery by the reciprocating motion of the piston, thereby reducing the operating temperature of the piston.

At the same time, the cooling galleries may increase overall complexity of the piston assembly and manufacturing of the same. For example, cooling galleries may require additional component, such as a cooling gallery cover, in order to encourage proper circulation of a coolant throughout the cooling gallery by temporarily trapping coolant (e.g., oil) that is circulated through the cooling gallery. The additional components such as cover plates also add complexity, however. Additionally, cooling galleries may be expensive and/or difficult to form in smaller piston applications such as in the case of lightweight or light duty pistons. Known methods of forming enclosed cooling galleries in one-piece pistons, such as friction welding, also require extremely high strength piston components to properly form the piston and cooling gallery features without unintended deformation during the friction welding process, thereby increasing size and weight of the resulting pistons. The large magnitude forces placed on the piston components during the friction welding process also limits where the weld joints may be located.

Accordingly, there is a need for a piston that minimizes overall piston weight and manufacturing complexity, while also allowing adequate cooling, such as by providing a cooling gallery.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein of a piston assembly and methods of making the same. An exemplary piston may include a piston body defining a piston axis, the piston body having a skirt and forming a lower surface of a cooling gallery. The body may include radially inner and outer body mating surfaces. The piston may further include a cooling gallery ring cooperating with the piston body to form the cooling gallery. The piston body and cooling gallery ring may be joined together along radially inner and radially outer interface regions to form a generally one-piece piston assembly. In some exemplary approaches, mating surfaces of the body and ring may be positioned adjacent a support surface configured to inhibit or prevent weld spatter formed in a process joining the ring and body from the cooling gallery.

Figure 1:
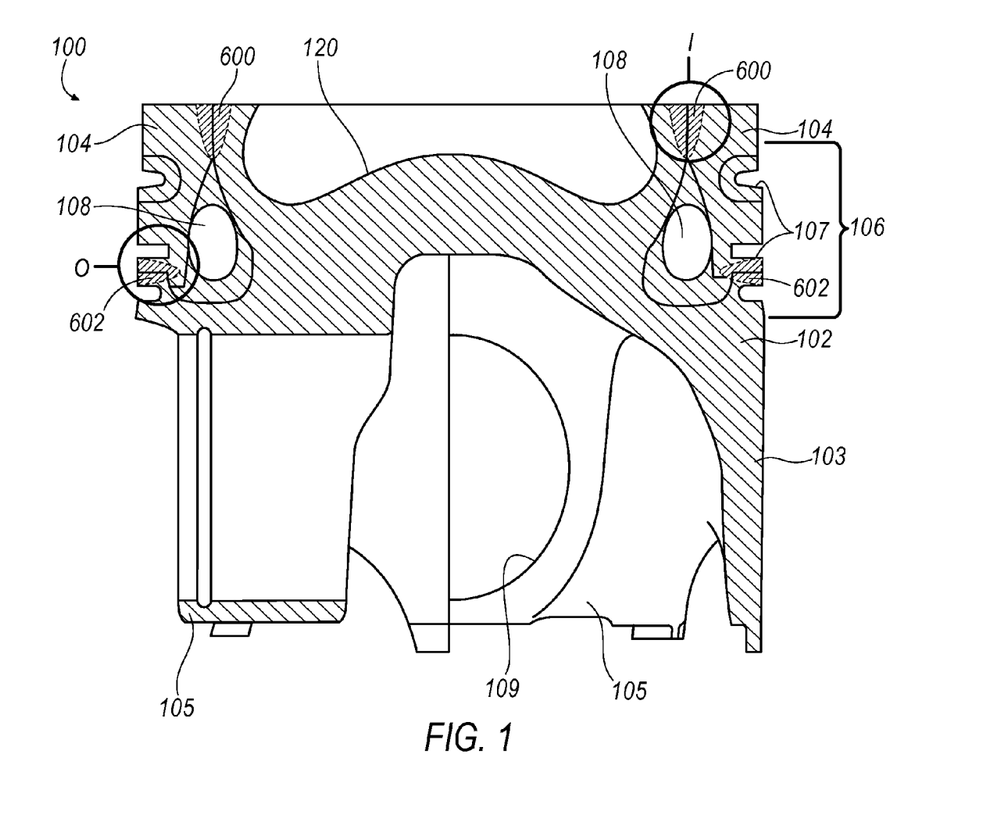
FIG. 1 is a sectional view of an exemplary piston assembly.
Figure 2A:
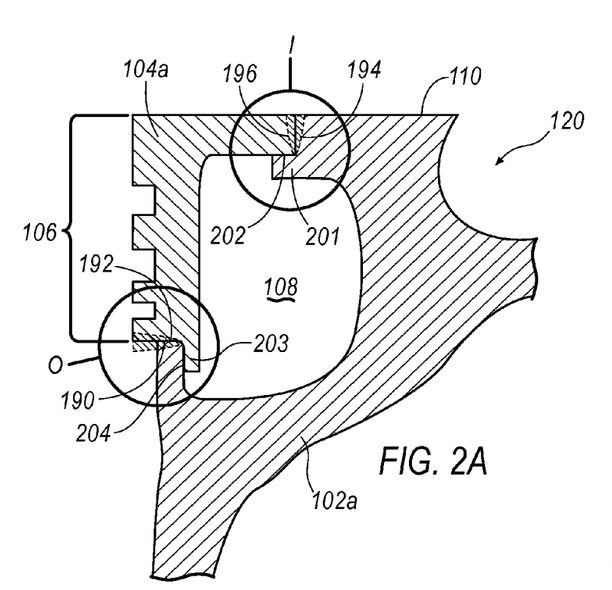
FIG. 2A is an enlarged sectional view of a cooling gallery of an exemplary piston assembly, e.g., as shown in FIG. 1.

In some exemplary illustrations, e.g., as shown in FIGS. 1 and 2A and described further below, the cooling gallery ring includes a radially inner ring mating surface abutted with a radially inner body mating surface along an upper surface of the piston. Thus, a joint between the radially inner ring mating surface and radially inner body mating surface may be positioned radially outward of the combustion bowl. A radially outer joint between the cooling gallery ring may be positioned radially outwardly from the radially inner joint, e.g., along a ring belt wall of the piston. More specifically, a radially outer interface region may generally be defined by a radially outer ring mating surface of the cooling gallery ring that is abutted with a radially outer body mating surface. The cooling gallery may be substantially enclosed by the cooling gallery ring part and the piston body part, excepting inlets/outlets associated with the cooling gallery.

Figure 2B:
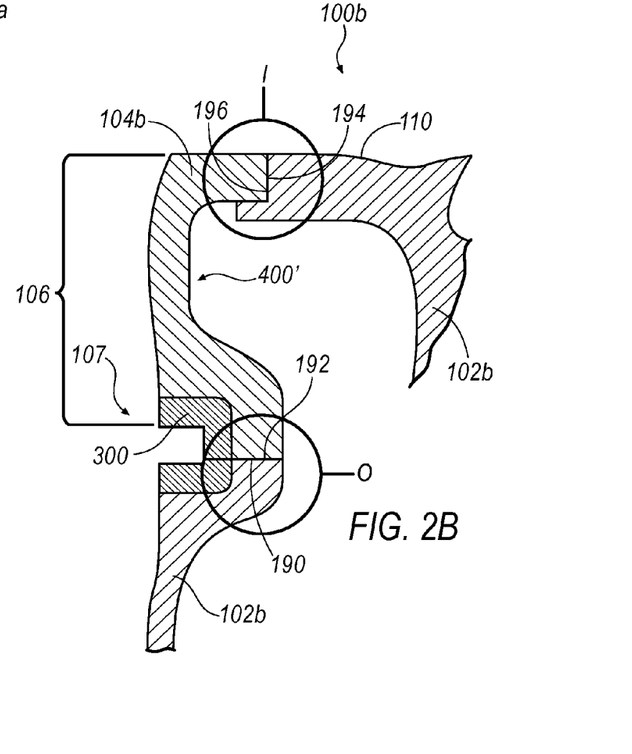
FIG. 2B is an enlarged sectional view of a cooling gallery of another exemplary piston assembly.

In other exemplary approaches, e.g., as illustrated in FIG. 2B and described further below, the radially inner and outer interface regions between a cooling gallery ring and the piston body are positioned within the combustion bowl and along the top surface of the piston, respectively. More specifically, in these examples the cooling gallery ring may include a radially inner ring mating surface abutted along a radially inner interface region in the combustion bowl with the radially inner body mating surface, with the cooling gallery ring including a radially outer ring mating surface abutted along a radially outer interface region with the radially outer body mating surface such that the cooling gallery is substantially enclosed.

In some exemplary illustrations, pistons may be joined in a welding process, e.g., a laser welding process. Exemplary laser welding processes, as will be described further below, may facilitate substantial gains in manufacturing flexibility. In one example, at least one of the radially inner and outer mating surfaces is aligned non-perpendicular to the piston axis. For example, a generally vertical weld joint is possible, i.e., where the corresponding mating surfaces of two piston components being joined are aligned generally parallel to a longitudinal axis of the piston. Moreover, abutting surfaces of a laser welded joint may define virtually any angle so long as the joint is accessible by an impinging laser welding beam. An elongated weld joint may generally result from, in one exemplary illustration, a laser welding process where a laser beam is impinged generally parallel to corresponding mating surfaces of a piston body and a cooling gallery ring.

Turning now to FIG. 1, an exemplary piston assembly 100 is illustrated in section. More specifically, the section illustrated in the left half of FIG. 1 is taken through a pin boss 105 of the piston assembly 100, while the section illustrated in the right half of the drawing is taken at an angle ninety (90) degrees from that on the left half. Piston assembly 100 may include a piston body 102 and a cooling gallery ring 104 that is received about an upper portion of the body 102. The piston body 102 may define a combustion bowl 120. The cooling gallery ring 104 may define a ring belt portion 106 that is configured to seal against an engine bore (not shown) receiving the piston assembly 100. For example, the ring belt portion 106 may define one or more circumferential grooves 107 that receive piston rings (not shown), which in turn seal against engine bore surfaces during reciprocal motion of the piston assembly 100 within the engine bore. The generally two-piece construction of the piston assembly 100, i.e., with the cooling gallery ring 104 and the body 102, may generally allow flexibility in regard to the size and shape of the cooling gallery ring 104 and/or the piston assembly 100, e.g., allowing a lower overall compression height and/or center of gravity of the piston assembly 100. Moreover, the two-piece construction may also facilitate the forming of more complex shapes within the cooling gallery to allow greater ease of manufacturing of effectively sized galleries that provide enhanced cooling ability.

The piston body 102 may include a skirt surface 103 that generally supports the piston assembly 100 during engine operation, e.g., by interfacing with surfaces of an engine bore (not shown) to stabilize the piston assembly 100 during reciprocal motion within the bore. For example, the skirt surface 103 may generally define a circular outer shape about at least a portion of a perimeter of the piston assembly 100. The outer shape may correspond to the engine bore surfaces, which may be generally cylindrical.

The body 102 may also define the piston pin bosses 105. The piston pin bosses 105 may generally be formed with apertures or pin bores 109 configured to receive a piston pin (not shown). For example, a piston pin may be inserted through the pin bores 109 in the piston pin bosses 105, thereby generally securing the piston 100 to a connecting rod (not shown).

As noted above, the piston 100 may have a ring belt portion 106 which defines, at least in part, a cooling gallery 108. The cooling gallery 108 generally extends about a perimeter of the piston crown, and may circulate a coolant during operation, e.g., engine oil, thereby reducing an operating temperature of the piston. Additionally, the circulation of the coolant may facilitate the maintaining of a more stable or uniform temperature about the piston 100, and especially in the upper portion of the piston assembly 100, e.g., adjacent the combustion bowl 120.

A piston body 102 and ring 104 may be fixedly joined, e.g., in a laser welding process. By fixedly joining the piston body 102 and ring 104, the piston assembly 100 is generally formed as a one-piece assembly.

As shown in FIGS. 1, 2A, 2B, 3, 4, and 5, and as described further below, the body 102 and ring 104 components may be joined along both a radially inner interface region I, and a radially outer interface region O, for example in a laser welding process. Accordingly, the piston body 102 may be generally unitized with their respective cooling gallery rings 104 such that each is immovable relative to the other after securement to the crown, although the body 102 and ring 104 are separate components.

The cooling gallery rings 104 may be secured to the body 102 such that the body 102 and the ring 104 cooperate to form a continuous upper combustion bowl surface 120 of the piston assembly 100.

Referring now to the exemplary pistons 100a, 100b shown in FIGS. 2A and 2B, corresponding radially outer mating surfaces 190, 192 of the bodies 102a, 102b (collectively, 102) and of the rings 104a, 104b (collectively 104), may meet along the ring belt portions 106 of the pistons 100a, 100b, respectively, in a radially outer interface region O. Additionally, corresponding radially inner mating surfaces 194, 196 of the body 102 and ring 104, respectively, may meet along a top surface 110 of the pistons 100a, 100b, thereby defining a radially inner interface region I. In the examples shown in FIGS. 2A and 2B, no weld joint between the cooling gallery rings 104 and bodies 102 are positioned within the combustion bowls 120 of the pistons 100a, 100b.

Figure 3:
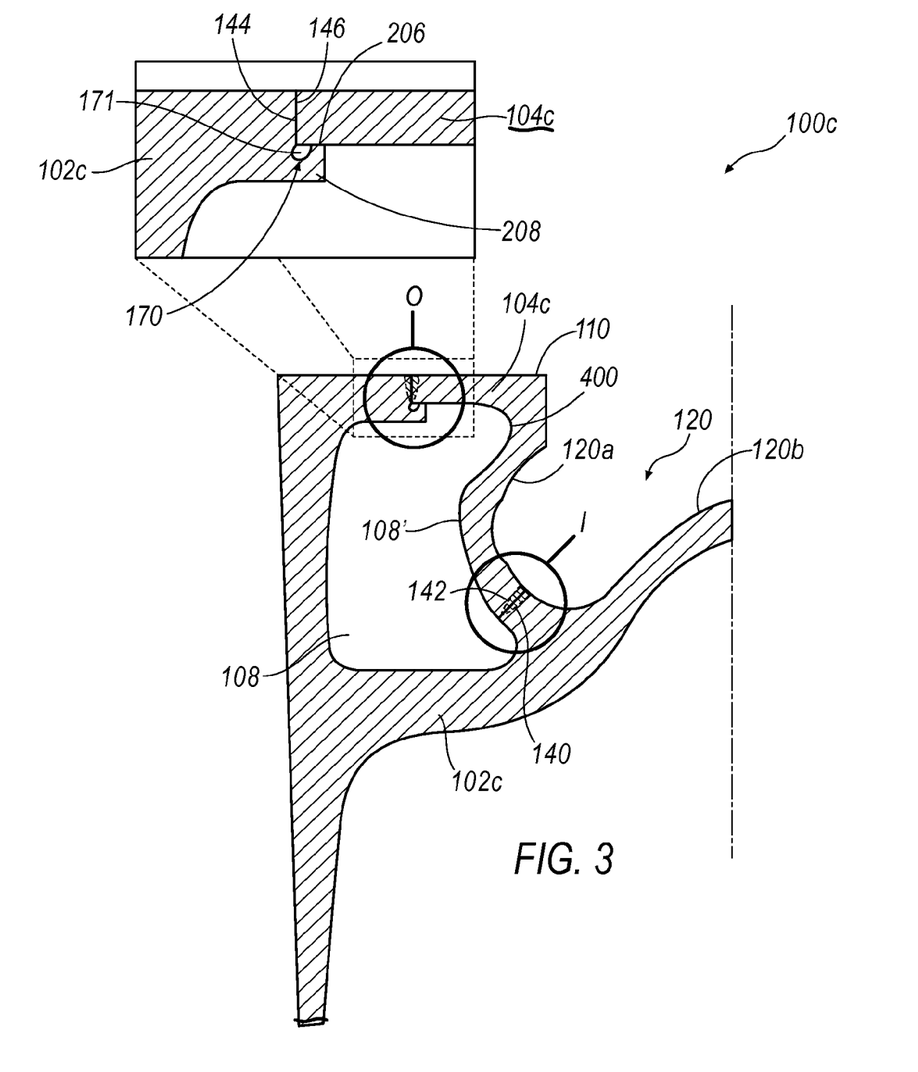
FIG. 3 is an enlarged sectional view of a cooling gallery of another exemplary piston assembly.

Referring now to the exemplary piston 100c shown in FIG. 3, in contrast to the exemplary approaches shown in FIGS. 2A and 2B, corresponding radially outer mating surfaces 144, 146 of the body 102c and ring 104c, respectively, may meet along the upper surface 110 of the piston in a radially outer interface region O of a piston 100, while corresponding radially inner mating surfaces 140, 142 of the body 102c and ring 104c, respectively, may meet within the combustion bowl 120 along the radially inner interface region I. Accordingly, the radially inner interface region I and associated weld joint between the cooling gallery ring 104c and body 102c are positioned within the combustion bowl 120, with the cooling gallery ring 104c defining a first radially outer portion 120a of the combustion bowl 120. Further, the body 102c may define a radially inner portion 120b of the combustion bowl surface 120 that is disposed radially inwardly of the radially inner interface region I.

Exemplary pistons 100 may generally employ one or more support surfaces along the radially inner and/or outer interface regions I, O for stabilizing the respective interface region I or O. For example, as seen in FIG. 2A, the radially inner mating surface 194 of the body 102a includes a step portion 201 extending beneath the radially inner mating surface 196 of the ring 104a. The step portion 201 defines a laterally extending surface 202 which faces upwardly toward the radially inner interface region I. Additionally, the radially outer mating surface 192 of the cooling gallery ring 104a defines a second step portion 203 having a vertically extending surface 204. The laterally extending surface 202 and the vertically extending surface 204 may each generally buttress the radially inner and outer interface regions I, O, respectively, providing support to the respective joints between the body 102 and the ring 104a. Moreover, the surfaces 202, 204 may also inhibit (or prevent entirely) weld spatter from intruding into the cooling gallery 108, e.g., and thereby prevent weld spatter from adhering to interior surfaces of the cooling gallery 108.

Turning now to FIG. 3, the radially outer mating surface 144 of the body 102 is shown with a step portion 208 defining a laterally extending surface 206. The surface 206 may generally support the radially outer interface region O and/or may prevent or inhibit weld spatter from intruding into the cooling gallery 108. Moreover, a spatter trap 170 is provided that generally collects weld spatter during a welding operation, thereby minimizing or preventing entirely any weld spatter from reaching the cooling gallery 108. More specifically, the spatter trap 170 generally defines an unfilled volume or cavity 171 behind a weld site, such that weld spatter that is forced away from the impinging laser beam and/or the joint, e.g., in a longitudinally downward direction in FIG. 3, may generally be collected within the cavity 171 of the spatter trap 170.

The exemplary cooling gallery ring 104c illustrated in FIG. 3 also includes an undercut portion 400 such that an upper portion of the cooling gallery 108 extends radially inwardly further than an interior surface 108' of the cooling gallery 108. Forming an undercut 400, e.g., by machining the ring 104c, may be simplified in configurations where the radially inner weld joint and interface region I is positioned within the combustion bowl 120. The greater ease of manufacturing such a shape may result from the fact that the undercut 400 is positioned in an area of the ring 104c that is more accessible with a tool, e.g., a machining tool. Accordingly, the undercut 400 may be more easily formed in the cooling gallery ring 104c, as opposed to the body 102c which may be more restrictive of access to the cooling gallery 108, e.g., with a machining tool.

Moreover, as shown in FIG. 2B, in other exemplary approaches an undercut portion 400' may be formed in the cooling gallery ring 104b such that the undercut portion 400' is in a radially outer portion of the cooling gallery 108.

Where a piston 100 includes a radially outer interface region in a ringland area, e.g., as shown in FIGS. 2A and 2B, a ring insert 300 (see FIG. 2B) may be provided to enhance a strength of the ring groove 108 and improve retention of a piston ring (not shown) therein. Moreover, the increased strength offered by the ring insert 300 may be particularly advantageous for pistons formed of non-steel materials, e.g., aluminum. The ring insert 300 may be formed of any material that is convenient, e.g., a metallic material.

In each of the illustrated examples in FIGS. 1, 2A, 2B, and 3, the combustion bowl surface 120 may be substantially smooth across an interface, e.g., radially inner interface region I and/or radially inner interface region O, between the ring 104 and the body 102, thereby minimizing disruptions and/or discontinuities in the surface 120. For example, in the examples of FIGS. 2A and 2B, no weld joint is present within the combustion bowl 120 and thus the combustion bowl is relatively smooth. On the other hand, in the example shown in FIG. 3 where the combustion bowl includes a joint between the ring 104 and body 102, welding and/or machining operations used in the formation of piston assembly 100 may generally attempt to reduce surface irregularities in the combustion bowl surface 120. Minimizing such disruptions or discontinuities may generally reduce cracks or other loosening of an interface between the body 102 and the ring 104 along the interface regions I, O during normal long-term operation. Accordingly, any defects or failure in the combustion bowl surface 120, e.g., due to wear occurring during operation of an engine using piston assembly 100, may be minimized.

Figure 4:
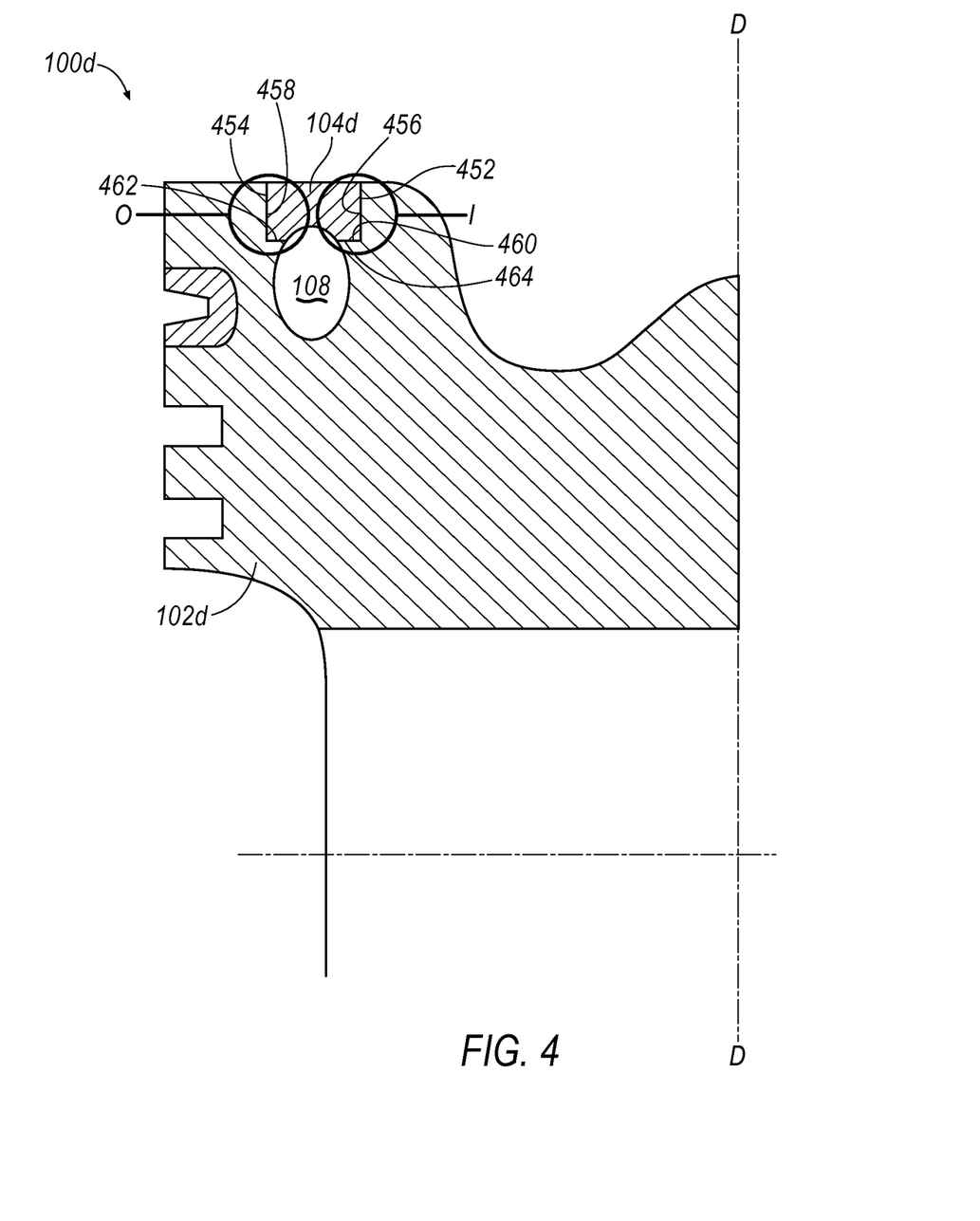
FIG. 4 is a sectional view of another exemplary piston assembly.

Turning now to FIG. 4, another exemplary piston assembly 100d is illustrated, comprising a body 102d and cooling ring 104d. The cooling ring 104d defines radially inner and outer mating surfaces 452, 454, respectively. The inner and outer mating surfaces 452, 454 of the cooling ring 104d are engaged with corresponding radially inner and outer mating surfaces 456, 458 of the piston body 102d. The inner and outer mating surfaces 452, 454, 456, 458 are each aligned in a substantially vertical direction with respect to the piston assembly 100d, i.e., substantially parallel to a longitudinal axis D-D of the piston assembly 100d. The cooling gallery ring 104d may be received within a channel formed by the radially inner and outer mating surfaces 456, 458 of the body 102d. Subsequently, the cooling gallery ring 104d may be joined to the body 102d, e.g., by laser welding along a radially inner interface region I defined by the radially inner mating surfaces 452, 456, and also along a radially outer interface region O defined by the radially outer mating surfaces 454, 458.

As noted above, the cooling gallery ring 104d may initially be received within the channel defined between the radially inner and outer mating surfaces 456, 458 of the body 102d. The cooling gallery ring 104d may be supported by laterally extending support surfaces 460, 462, allowing the cooling gallery ring 104d to rest within the channel defined between the radially inner and outer mating surfaces 456, 458 of the body 102d prior to any joining operation of the cooling gallery ring 104d and body 102d. More specifically, the laterally extending support surfaces include a radially inner support surface 460 and a radially outer support surface 462. The support surfaces 460, 462 each generally extend in a lateral direction with respect to the piston assembly 100d, i.e., in a direction substantially perpendicular to the axis D-D of the piston assembly 100d.

In one exemplary approach, the cooling gallery ring 104d may be welded in a laser welding process to the body 102d. In such examples, the support surfaces 460, 462 may each inhibit or prevent ingress of weld spatter formed in the laser welding operation into the cooling gallery 108. More specifically, weld spatter may be prevented from reaching the cooling gallery 108 by virtue of the laterally extending support surfaces 460, 462, which generally space the mating surfaces 452, 454, 456, and 458 laterally away from the cooling gallery 108 and/or an entry into the cooling gallery 108 from the mating surfaces 452, 454, 456, and 458. Additionally, the support surfaces 460, 462 cooperate with a backside surface 464 of the cooling gallery ring 104d to form an undulation or tortuous path that inhibits weld spatter from reaching the cooling gallery 108.

Figure 5:
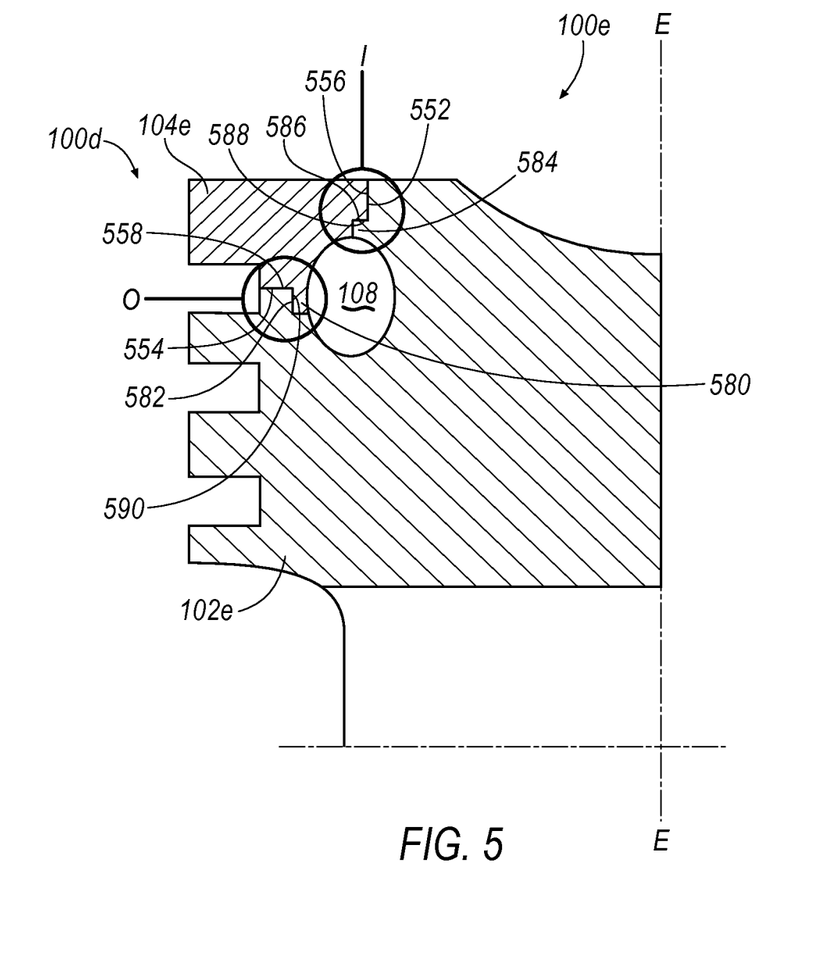
FIG. 5 is a sectional view of another exemplary piston assembly.

Turning now to FIG. 5, another exemplary piston assembly 100e is illustrated, comprising a body 102e and cooling ring 104e. The cooling ring 104e defines radially inner and outer mating surfaces 552, 554, respectively. The inner and outer mating surfaces 552, 554 of the cooling ring 104e are engaged with corresponding radially inner and outer mating surfaces 556, 558 of the piston body 102e. The inner mating surfaces 552, 554 of the piston assembly 100e are aligned substantially parallel with respect to a longitudinal axis E-E of the piston assembly 100e, while the radially outer mating surfaces 556, 558 are aligned substantially perpendicular to the axis E-E. The cooling gallery ring 104e may be placed upon the body 102d such that the mating surfaces 552, 554 are aligned with the corresponding mating surface 556, 558 of the body 102e, respectively. Subsequently, the cooling gallery ring 104e may be joined to the body 102e, e.g., by laser welding along a radially inner interface region I defined by the radially inner mating surfaces 552, 556, and also along a radially outer interface region O defined by the radially outer mating surfaces 554, 558.

The cooling gallery ring 104e may include a vertically extending support 580 which defines a vertically extending support surface 582 facing radially outwardly with respect to the piston assembly 100e. Additionally, the piston body 102e may define a laterally extending support 584 which defines a laterally extending support surface 586.

In one exemplary approach, the cooling gallery ring 104e may be welded in a laser welding process to the body 102e. In such examples, the support surfaces 582, 586 may each inhibit or prevent ingress of weld spatter formed in the laser welding operation into the cooling gallery 108. More specifically, weld spatter may be prevented or inhibited from reaching the cooling gallery 108 from the radially outer interface region O by virtue of the vertically extending support surface 582, which generally spaces the mating surfaces 554, 558 vertically away from an entry into the cooling gallery 108. Similarly, weld spatter from the radially inner interface region I may be prevented or inhibited from reaching the cooling gallery 108 by the laterally extending support surface 586. The support surface 586 of the body 102e may cooperate with a backside surface 588 of the cooling gallery ring 104e to form an undulation or tortuous path positioned between the mating surfaces 552, 556 and the cooling gallery 108, thereby inhibiting or preventing weld spatter from reaching the cooling gallery 108 from the radially inner interface region I. Additionally, the support surface 582 of the cooling gallery ring 104e may cooperate with a backside surface 590 of the body 102e to form an undulation or tortuous path positioned between the mating surfaces 554, 558 and the cooling gallery 108, thereby inhibiting or preventing weld spatter from reaching the cooling gallery 108 from the radially outer interface region O.

In each of the exemplary illustrations shown in FIGS. 1, 2A, 2B, 3, 4, and 5, the piston body 102 and the cooling gallery ring 104 may be secured or fixedly joined to one another in a welding operation such as laser welding. In one exemplary illustration, the piston body 102 and cooling gallery ring 104 are secured to one another along both the radially inner and outer interface regions I, O. A laser weld may allow the weld tool to form a generally smooth surface along external surfaces of the piston 100 adjacent the interface regions I, O. This may be particularly advantageous in providing a relatively smooth combustion bowl surface 120 where a joint is positioned in the combustion bowl 120, and may accordingly reduce any need to subsequently machine external piston surfaces such as the combustion bowl surface 120. In one exemplary illustration, at most minimal machining operations before and/or after a welding process associated with joining the body 102 and the cooling gallery ring 104 may be needed. Moreover, in some examples no machining at all may be necessary.

A laser welding operation may generally allow the formation of a solid metallic weld between the body 102 and the ring 104 while also minimizing the size of an associated heat affected zone. More specifically, a weld laser may generally be employed to propagate a heat affected zone in the radially inner interface region I and/or radially outer interface regions O, which may include or be directly adjacent mating surfaces of the body 102 and ring 104, thereby welding together the body 102 and ring 104 along the mating surfaces in the interface regions I, O.

Exemplary heat-affected zones (HAZ) 600, 602 are illustrated in the radially inner and outer interface regions I, O, respectively, in FIG. 1, as indicated by the shaded regions. The HAZ 600, 602 may generally represent zones in which material of the cooling gallery ring 104 and body 102 are melted or otherwise affected to join the two components. As best seen in FIG. 1, the heat affected zones 600, 602 may generally define a narrowing width extending further into the joint, generally corresponding to a diminishing ability of a laser to affect material laterally spaced from the laser moving in a direction deeper into the joint.

Where the ring 104 and body 102 are joined using a laser welding process, a weld laser may be used in a generally continuous welding process that extends substantially about the entire circumference of the interface regions I and/or O, such that the weld extends substantially about the entire piston 100. Alternatively, a series of discrete welds may be made along the circumferential extent of the interface region I and/or O.

A laser welding operation used to join the body 102 and cooling gallery ring 104 may have several advantages compared with other welding methodologies such as friction welding. A laser welding operation typically results in a relatively small heat-affected zone, sometimes as little as a few millimeters. Nevertheless, the heat affected zone may advantageously include a mating surface of the body 102 as well as a corresponding mating surface of the ring 104, as will be described further below. Additionally, a laser weld may be performed in virtually any location on the piston 100 that can be accessed by an impinging laser beam. Accordingly, a laser welding operation may allow substantial flexibility in choosing the location on the piston 100 for an interface region between the body 102 and ring 104, e.g., the radially inner and outer interface regions I, O.

By comparison, known friction welding methods generally require mating surfaces of the joined components to be normal to the weld and/or piston axis. More specifically, surfaces being friction welded together must generally be aligned normal to a direction associated with the movement of the welded components during the friction welding process, which typically is parallel to the piston axis. Additionally, the extremely large magnitude forces used to drive components being friction welded together requires correspondingly large degrees of support for the welded surfaces in order to prevent damage to the components during welding. Finally, friction welding necessarily requires that components be rotationally symmetrical in order to allow joining the cylindrical parts by rotation at high speeds. A laser welding process, by contrast, does not require the piston components, e.g., body 102 and ring 104, to resist the extremely large application forces such as those applied during a friction welding process. Additionally, a laser welding process does not require rotational symmetry since no parts need be moved or rotated during the laser welding process. In fact, asymmetrical or offset interface regions may be employed, e.g., resulting in an asymmetrical combustion bowl (not shown).

Cooling gallery 108 may advantageously define one or more openings (not shown) that allows for gases to escape during a laser welding process. The provision of at least one opening may be beneficial during the welding process, when any gases or air present inside the cooling gallery 108 will tend to expand rapidly. The openings may thereby prevent damage to the cooling gallery 108 and adjacent surfaces of the piston 100 due to the expansion of gases or air. Moreover, a "keyhole effect" of the expanding gases may damage the weld along the interface regions I, O. More specifically, as the weld seals the cooling gallery 108, expanding gases will tend to damage the weld zone by escaping through the molten material before the material adequately hardens, unless an escape path is provided for the expanding gases, e.g., by the openings. Additionally, openings may be needed to allow coolant, e.g., oil, to be circulated through the cooling gallery during operation. Moreover, any openings may also allow for removal of weld spatter from a laser welding process, as will be described further below. In one exemplary illustration, one or more openings, e.g., opening 150, are provided in the cooling gallery 108 in a lower surface thereof, thereby allowing the openings to be employed as oil/cooling circulation inlets or outlets during operation of the piston 100.

The piston body 102 and cooling gallery ring 104 of the exemplary pistons 100 may be constructed from any materials that are convenient, e.g., which are susceptible to being laser welded. Merely by way of example, any metallic containing compounds that are receptive to being laser welded may be employed. In one exemplary illustration, the body 102 and cooling gallery ring 104 are formed of the same material, e.g., aluminum. In another example, the body 102 and cooling gallery ring 104 are each formed of a steel material. Moreover, the body 102 and cooling gallery ring 104 need not be formed of a same material. Accordingly, a material used for the components may be more closely matched with the general requirements and operating conditions relevant to each. Piston body 102 may, merely as examples, include different mechanical properties, e.g., yield point, tensile strength or notch toughness, than the cooling gallery ring 104. Any material or combination may be employed for the body 102 and cooling gallery ring 104 that is convenient. Merely as examples, the body 102 and/or cooling gallery ring 104 may be formed of an aluminum material, a steel material, cast iron, composite, or powdered metal material. The body 102 and/or cooling gallery ring 104 may also be formed in different processes, e.g., the body 102 may be a generally single cast piece, while the cooling gallery ring 104 may be forged. Any material and/or forming combination may be employed that is convenient. As noted above, certain material selections, e.g., aluminum for the body 102 and cooling gallery ring 104, may benefit features described herein that offer increased localized rigidity or strength such as the piston ring insert 300 and/or support surfaces in one or both interface regions I, O of the piston 100.

Prior to securing the body 102 and ring 104 together, e.g., via laser welding, the body 102 and ring 104 may be pre-assembled in a secure and yet non-permanent manner. For example, a shrink fit or interference fit between the two components may be employed. In one example, the body 102 is placed at an elevated temperature, initiating a thermal expansion sufficient to allow insertion of the ring 104 into the body 102. Upon cooling of the body 102 to a lower temperature, the thermal expansion of the body 102 is reversed, thereby constraining the ring 104 in place. In another exemplary illustration, the body 102 and ring 104 are formed of materials having different coefficients of thermal expansion, such that application of heat to both components results in a greater degree of thermal expansion of the body 102, allowing insertion of the ring 104.

A small weld tack may, alternatively or in addition to the shrink fit or interference fit described above, be employed to further secure the body 102 and ring 104 together prior to permanently joining the body 102 and ring 104, e.g., in a laser welding process.

A laser welding process may advantageously allow for smaller heat-affected zones in the components being welded together, e.g., of only a few millimeters, as noted above. However, the relatively small heat-affected zone may also result in an extreme temperature gradient within the material adjacent the heat affected zone or weld. Accordingly, cracks may propagate in the welded material due to the large temperature change in the material over a very small distance. It may therefore be desirable to reduce this gradient by pre-heating the welded components, e.g., in a furnace or by induction. In one exemplary illustration, both the body 102 and ring 104 are heated to between approximately 200 and 600 degrees Celsius.

Any variety of laser welding systems may be employed as part of an exemplary laser welding process. For example, a solid state, disk, carbon-dioxide, or fiber laser may be employed. Carbon-dioxide laser systems are well known and may therefore be more familiar in mass manufacturing settings than, for example, more recently developed fiber laser systems. However, a carbon-dioxide laser process also typically requires a large machine that cannot be easily moved, e.g., around a manufacturing facility, whereas a solid state laser may be employed anywhere a fiber or light-transmitting medium can be extended.

Typically, a thicker weld joint may require a greater power laser to properly melt the materials being joined. In one exemplary illustration, a 6 millimeter (mm) thickness of the materials being joined is adequately welded with a 6 kilowatt (kW) laser at a feed rate of 2.0 meters per minute, using a beam width or thickness of 300-400 micrometers ($\mu m$).

In another exemplary illustration, multiple laser beams may be employed to execute a laser welding process. More specifically, two beams may be used which travel together about an interface region I or O of a piston 100, with one beam following behind the other. Power of the laser may be generally evenly divided between the two beams. In one example, a spacing of 0.2-0.5 millimeters between the laser beams may be employed. In another example, a spacing of 0.39 millimeters is used. The focal length of the laser beams may be between approximately 150-400 millimeters and in one example is approximately 300 millimeters. Moreover, a laser may be used at a power level between approximately 3.5 kW-6.0 kW, and a feed rate (i.e., a speed at which the laser beam(s) travel along an interface region I and/or O during a welding operation) of 1.0-2.0 meters/second.

After welding the body 102 and ring 104 together, any weld spatter may be removed from the cooling gallery 108. In one exemplary illustration, a high pressure flushing operation may be employed, where a fluid is circulated through the cooling gallery 108 at high pressure. Removal of weld spatter may be facilitated, as noted above, with a coating on the inner surfaces of the cooling gallery 108, e.g., a carbon coating. The exemplary support surfaces described above in regard to the pistons 100 may generally reduce a need for removal of weld spatter, and in some cases may eliminate the need entirely.

Figure 6:
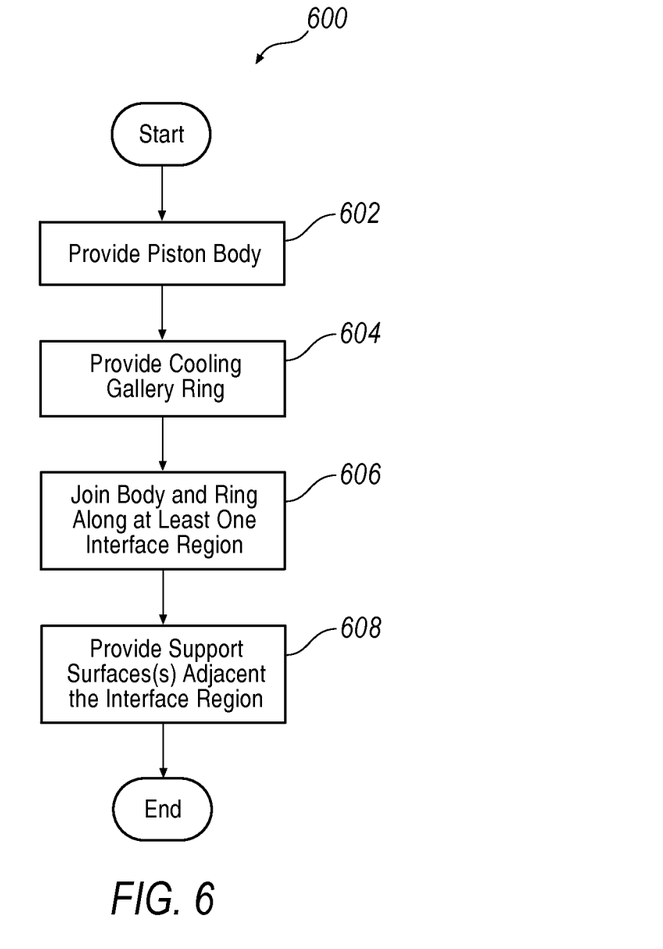
FIG. 6 is a process flow diagram for an exemplary method of making a piston assembly.

Turning now to FIG. 6, an exemplary process 600 for making a piston assembly is illustrated. Process 600 may begin at block 602, where a piston body is provided. For example, as described above a piston body 102 may be formed, e.g., in a casting, forging, or machining process, merely as examples. Moreover, the piston body 102 may include radially inner and outer mating surfaces, e.g., as described above for piston assemblies 100a, 100b, 100c, 100d, or 100e. Process 600 may then proceed to block 604.

At block 604, a cooling gallery ring may be assembled to the body. For example, as described above a cooling gallery ring 104 may be formed, e.g., in a casting, forging, or machining process, merely as examples. Moreover, the cooling gallery ring 104 may include radially inner and outer mating surfaces corresponding to those of the piston body 102. In some exemplary approaches, the ring 104 may be assembled to the body 102 in a manner to facilitate secure positioning of the ring 104 relative to the body 102, without permanently securing the two components together. For example, a shrink fit may be used, e.g., by bringing the temperature of the body 102 to a sufficiently elevated temperature such that the ring 104 fits into the body 102, or vice versa. Moreover, a relatively small mechanical fastening between the body 102 and ring 104 may be employed, e.g., a weld tack. Additionally, as noted above the ring 104 may be formed of a same material or a different material as the body 102. Process 600 may then proceed to block 606.

At block 406, the body 102 may be joined to ring 104 along at least one interface region. For example, as noted above in some exemplary approaches a laser weld may be employed to join corresponding mating surfaces of the ring 104 and body 102 along a radially inner interface region I and/or a radially outer interface region O. At least one of the cooling gallery ring 104 and the body 102 may be pre-heated, e.g., to facilitate pre-assembly of the ring 104 and body 102, as well as reduce temperature gradients within the ring 104 and/or body 102 as a result of a laser welding process.

Proceeding to block 408, at least one support surface may be provided adjacent a mating surface of the cooling gallery ring 104 and/or body 102. Merely as examples, as described above surfaces 202 and/or 204 of piston assembly 100a, surfaces 206 of piston assembly 100c, surfaces 460, 462 of piston assembly 100d, and surfaces 582, 586 of piston assembly 100e may generally define in part an angled or tortuous path, and/or an undulation which generally inhibits weld spatter from an adjacent mating surface of the cooling gallery ring 104 and/or body 102 from reaching the cooling gallery 108.

In some examples, weld spatter may subsequently be removed from the piston, and in particular from the cooling gallery 108, e.g., by "catching" spatter with a temperature-resistant material or flame-resistant material placed within the cooling gallery 108 prior to laser welding, or by using a high-pressure flushing operation to dislodge and remove any weld spatter that adheres to the interior surfaces of the cooling gallery 108. Nevertheless, the support surface(s) may inhibit or eliminate entirely weld spatter that is created within the cooling gallery 108, reducing or eliminating the need for weld spatter removal in some examples.

The exemplary pistons 100 disclosed herein may be employed in small and large bore diameter applications, generally without limitation. The reduced material flash and weld joint size may advantageously allow for smaller overall geometry of the piston 100. Compression height, i.e., ratio of piston diameter to a distance between the upper surface 110 and a center of the bore defined by the pin bosses 105 may be reduced. In one exemplary illustration, a piston 100 may have a compression height of approximately twenty-five (25) to fifty-five (55) percent (compared with known compression heights of approximately fifty-five (55) to seventy (70) percent for a comparable friction welded design). The minimal or nonexistent weld flash may also facilitate shallow bowl geometry. Finally, a smaller compression height reduces size and weight of the piston 100, allowing smaller engine blocks and smaller components overall, allowing greater freedom in vehicle packaging around the engine block. A longer connecting rod may also be employed where compression height is minimized, reducing lateral forces during engine operation against the engine bore. This may in turn reduce friction between the piston 100 and the bore, improving engine efficiency.

Additionally, the piston assembly 100 may also tolerate increased peak combustion pressures as a result of the rigidity of the piston assembly 100 and the additional flexibility in material selection. Manufacturing costs may also be reduced due to the simplified forging and welding processes that may be used in some exemplary illustrations.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    providing a piston body that forms an entire upper combustion bowl surface, which is free from welds, the piston body forming a first portion of a cooling gallery, the piston body including radially inner and radially outer body mating surfaces and defining a piston axis;
    assembling a cooling gallery ring with the piston body, the cooling gallery ring forming a second portion of the cooling gallery, the cooling gallery ring including a radially inner ring mating surface and a radially outer ring mating surface;
    forming the cooling gallery with the first and second portions by laser welding the piston body to the cooling gallery ring along a radially inner interface region, the radially inner interface region including the radially inner mating surfaces of the piston body and the cooling gallery ring; and laser welding the piston body to the cooling gallery ring along a radially outer interface region, the radially outer interface region including the radially outer mating surfaces of the piston body and cooling gallery ring;

wherein, at the radially inner interface region, the piston body includes a body step portion formed on the piston body being axially offset to and extending radially from the radially inner body mating surface, the body step portion comprising a laterally extending surface that faces the cooling gallery ring, and the body step portion forming a part of the cooling gallery; and wherein, at the radially outer interface region, the cooling gallery ring includes a cooling gallery step portion being radially offset to and axially extending from the radially outer ring mating surface, a vertically extending surface formed on the cooling gallery step portion that faces the piston body, and the cooling gallery step portion forms a part of the cooling gallery.

2. The method of claim 1, wherein the laser welding includes directing a weld laser substantially parallel to the piston axis toward the radially mating surfaces of the piston body and cooling gallery ring.

3. The method of claim 1, wherein the laser welding includes directing a weld laser in a direction toward the radially outer mating surfaces of the piston body and cooling gallery ring, the direction defining a non-parallel angle with respect to the piston axis.

4. The method of claim 1, wherein the piston body includes a skirt configured to interface with an engine bore surface.

5. The method of claim 1, further comprising heating at least one of the piston body and the cooling gallery ring prior to the laser welding.

6. The method of claim 1, wherein the body step portion includes a spatter trap configured to receive weld spatter, the spatter trap defining an enclosed volume adjacent to a weld site associated with one of the radially inner and outer interface regions.

7. The method of claim 1, wherein the piston body and cooling gallery ring are each formed of an aluminum material.

8. The method of claim 1, wherein the cooling gallery ring step portion is formed from a gallery ring radial surface and the vertically extending surface that is radially external to the gallery ring radial surface, and the piston body includes a piston body radial surface that faces radially inward and is engaged against the vertically extending surface.

9. A piston assembly, comprising:
a piston body having a top surface and having formed therein an uninterrupted unitary upper combustion bowl surface, the piston body having a skirt and forming a first portion of a cooling gallery, the piston body including radially inner and radially outer body mating surfaces and defining a piston axis; and
a cooling gallery ring forms a second portion of the cooling gallery and includes a radially inner ring mating surface abutted along a radially inner interface region with the radially inner body mating surface, the cooling gallery ring includes a radially outer ring mating surface abutted along a radially outer interface region with the radially outer body mating surface such that the cooling gallery is substantially enclosed as the first and second portions;
wherein the piston body and cooling gallery ring are welded together along the radially inner and radially outer interface regions;

wherein, at the radially inner interface region, the piston body includes a body portion formed on the piston body being axially offset to and extending radially from the radially inner body mating surface, the body step portion comprising a laterally extending surface that faces the cooling gallery ring, and the body step portion forming a part of the cooling gallery; and wherein, at the radially outer interface region, the cooling gallery ring includes a cooling gallery step portion being radially offset to and axially extending from the radially outer ring mating surface, a vertically extending surface formed on the cooling gallery step portion that faces the piston body, and the cooling gallery step portion forms a part of the cooling gallery.

10. The piston assembly of claim 9, wherein the body step portion includes a spatter trap configured to receive weld spatter, and the spatter trap defines an enclosed volume adjacent to a weld site associated with one of the radially inner and outer interface regions.

11. The piston assembly of claim 9, further comprising a ring insert received within a piston ring groove, the ring insert defining a cavity configured to retain a piston ring.

12. The piston assembly of claim 9, wherein the cooling gallery ring step portion is formed from a gallery ring radial surface and the vertically extending surface that is radially external to the gallery ring radial surface, and the piston body includes a piston body radial surface that faces radially inward and is engaged against the vertically extending surface.

13. A piston assembly, comprising:
a piston body having a top surface and having formed in the top surface an entire combustion bowl within the piston body, the piston body forms a first portion of a cooling gallery, the piston body includes radially inner and radially outer body mating surfaces, and the piston body forms a piston axis; and
a cooling gallery ring forms a second portion of the cooling gallery, the cooling gallery ring includes a radially inner ring mating surface abutted along a radially inner interface region with the radially inner body mating surface, the cooling gallery ring includes a radially outer ring mating surface abutted along a radially outer interface region with the radially outer body mating surface such that the cooling gallery is substantially enclosed;
wherein, at the radially inner interface region, the piston body includes a body step portion formed on the piston body being axially offset to and extending radially from the radially inner body mating surface, the body step portion comprising a laterally extending surface that faces the cooling gallery ring, and the body step portion forming a part of the cooling gallery; and wherein, at the radially outer interface region, the cooling gallery ring includes a cooling gallery step portion being radially offset to and axially extending from the radially outer ring mating surface, a vertically extending surface formed on the cooling gallery step portion that faces the piston body, and the cooling gallery step portion forms a part of the cooling gallery.

14. The piston assembly of claim 13, wherein the entire combustion bowl is a unitary surface within the top surface of the piston and the entire combustion bowl surface is free from welds.

15. The piston assembly of claim 13, wherein the cooling gallery ring step portion is formed from a gallery ring radial surface and the vertically extending surface that is radially external to the gallery ring radial surface, and the piston body includes a piston body radial surface that faces radially inward and is engaged against the vertically extending surface.

* * * * *

UNITED STATES PATENT AND TRADEMARK OFFICE
CERTIFICATE OF CORRECTION

PATENT NO. : 9,631,576 B2  
APPLICATION NO. : 14/186651  
DATED : April 25, 2017  
INVENTOR(S) : Michael T. Lapp et al.

Page 1 of 1

It is certified that error appears in the above-identified patent and that said Letters Patent is hereby corrected as shown below:

In the Claims

At Column 14, Claim number 9, Line number 19, insert --step-- between "a body" and "portion formed".

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*